United States Patent
Holtzman

(10) Patent No.: US 6,393,257 B1
(45) Date of Patent: May 21, 2002

(54) WIRELESS COMMUNICATIONS RECEIVER AND DECODER FOR RECEIVING ENCODED TRANSMISSIONS, SUCH AS TRANSMISSIONS USING TURBO CODES, AND ESTIMATING CHANNEL CONDITIONS

(75) Inventor: Jack M. Holtzman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/301,813

(22) Filed: Apr. 29, 1999

(51) Int. Cl.[7] .................. H04B 17/00; H04B 7/216
(52) U.S. Cl. .................. 455/67.3; 370/335; 370/342
(58) Field of Search ................... 370/335, 310, 370/342, 343, 350, 509, 514, 254; 375/227, 254, 324, 325, 365, 354, 346, 340–341; 455/63, 67.3, 67.1

(56) References Cited

U.S. PATENT DOCUMENTS

| 4,901,307 A | 2/1990 | Gilhousen et al. ............ 370/18 |
| 5,103,459 A | 4/1992 | Gilhousen et al. ............ 375/1 |

OTHER PUBLICATIONS

Valenti et al., "Performance of Turbo Codes in Interleaved Flat Fading Channels with Estimated Channel State Information", IEEE VTC 1998, Ottawa, Canada, pp. 66–70.*

Valenti et al, "Refined channel estimation for coherent detection of turbo codes over flat–fading channels", Electronics Letters, GB, IEE Stevenage, vol. 34, No. 17, pp. 1648–1649.*

1997 IEEE Communications Magazine, vol. 35, No. 12, "A Printer On Turbo Code Concepts", B. Sklar, pp. 94–102.

1997 International Conf. Telecommunications, "A Novel Variance Estimator for Turbo–Code Decoding", M. Reed et al., pp. 173–178.

1998 IEEE Transactions on Communications, vol. 46, No. 4, "SNR Mismatch and Online Estimation in Turbo Decoding", T. Summers et al., pp. 421–423.

* cited by examiner

Primary Examiner—Wellington Chin
Assistant Examiner—Maikhanh Tran
(74) Attorney, Agent, or Firm—Philip R. Wadsworth; Kent D. Baker; Thomas R. Rouse

(57) ABSTRACT

A method and corresponding apparatus separately estimates signal amplitude and noise in received signals, particularly symbols encoded using turbo codes. The method and apparatus, however, may be applied to such estimation in power control wireless systems (CDMA systems), other concatenated coding schemes, etc. A method and apparatus initially estimate the signal and noise, separately, in the received signal, such as by using curve fitting techniques. Thereafter, a finer estimate is provided by using the amplitude of received pilot symbols or using an estimate of the noise from the received pilot symbols.

28 Claims, 4 Drawing Sheets

POWER ESTIMATION IN A CDMA 2000 MOBILE AT 3KM/H

FUNCTION $\quad g(E(\chi^2)/E(|\chi|))$

WIRELESS COMMUNICATIONS RECEIVER AND DECODER FOR RECEIVING ENCODED TRANSMISSIONS, SUCH AS TRANSMISSIONS USING TURBO CODES, AND ESTIMATING CHANNEL CONDITIONS

FIELD OF THE INVENTION

The invention relates to communication systems. More particularly, the invention relates to methods and apparatus for improving reception and decoding of signals encoded using turbo codes.

DESCRIPTION OF THE RELATED ART

Wireless communication signals typically suffer from more interference and noise than wired communications. Additionally, there is a need to provide numerous channels over a given bandwidth. As a result, numerous encoding techniques have been developed, such as code division multiple access (CDMA). CDMA techniques in a communication system are disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING SIGNAL WAVEFORMS IN A CDMA CELLULAR TELEPHONE SYSTEM," both assigned to the assignee of the present invention.

CDMA modulation techniques can provide capacity improvements over other techniques, such as time division multiple access (TDMA) and frequency division multiple access (FDMA) based in part on CDMA's use of orthogonal functions or codes. Additionally, CDMA receivers employ Viterbi decoders that employ Viterbi algorithms to perform maximum likelihood decoding of received signals.

However, even Viterbi decoding suffers from decoding errors when receiving signals over a noisy channel. A new encoding scheme employing "turbo" codes employs a combination of two simple encoders that receive a block of K information bits, and which generate parity symbols from two simple recursive convolutional codes, each having a small number of states. The K information bits are sent uncoded, with the parity symbols, over a noisy channel. Importantly, an interleaver permutes the original K information bits before inputting such bits to the second encoder. The permutation causes one encoder to produce low-weight code words, while the other encoder produces high-weight code words. The resulting code is similar to "random" block codes with K information bits. Random block codes are known to achieve Shannon-limit performance when K is large, but truly random block codes require a prohibitively costly and complex decoding algorithm.

At the receiver, a pair of simple decoders employing iterative maximum a posteriori algorithms receive both the original K information bits, together with one of the sets of parity symbols from one of the two encoders. The decoders are individually matched to the simple codes, and each decoder sends an a posteriori likelihood estimate of the decoded bits to the other decoder, while using the corresponding estimates from the other decoder as an a priori likelihood. Uncommon information bits corrupted by the noisy channel are available to each decoder to minimize the a priori likelihoods, while the decoders use maximum a priori decoding algorithms, which requires the same number of states as the Viterbi algorithm. The two constituent decoders perform several iterations until reaching satisfactory convergence, at which point the final output is a hard-quantized version of the likelihood estimates of either of the decoders. Further details on turbo codes may be found, for example, in "A Primer On Turbo Code Concepts," by B. Sklar, *IEEE Communications Magazine*, 35:12 (December 1997).

Academic results have shown that turbo codes have the potential to improve information transmission over a noisy channel by a large amount, compared to classical Viterbi decoding, even results amazingly close to the theoretical Shannon-limit. Unfortunately, such results suppose idealized conditions at the receiver, which are in practice, very difficult to approach. One troublesome idealized condition is that the receiver is presumed to know the signal and noise power on a per symbol basis. This can be particularly difficult because the signals are multiplied by information bits, which makes the means or averages of the signals zero, thus disallowing usual averaging procedures for estimating signal noise power.

In one article, entitled "SNR Mismatch And Online Estimation In Turbo Decoding," by T. Summers and S. Wilson, *IEEE Transactions on Communications* 46:4 (April 1998), the authors note that iterative decoding of turbo codes, as well as other similar concatenated coding schemes, require knowledge of the signal-to-noise ratio (SNR) of the channel so that proper blending of the a posteriori information of the separate decoders is achieved. In this article, the authors study the sensitivity of decoder performance to misestimation of the SNR, and propose a scheme that estimates the unknown SNR from each code block, before decoding. This is for the additive white gaussian noise (AWGN) channel. However, such an approach does not provide the individual estimates of signal and noise, needed for turbo codes in fading channels. Indeed, without good channel estimation, turbo encoding is much less attractive, if not worse, when compared to conventional Viterbi decoding of a convolutional code.

The inventors have found, through experimentation, that classical techniques for estimating channel conditions induce a loss in performance because of the poor performance of such estimation techniques. The inventors have found a new set of techniques for signal and noise power estimation that apply not only to turbo codes, but to applications in other fields where such type of estimation is needed (e.g., power control in CDMA telecommunications systems, other concatenated coding schemes, etc.). Such new techniques estimate the signal to noise ratio in received signals, and importantly, provide estimations of signal and noise separately, and thereby provide important improvements over the method described in the Summers and Wilson article. Moreover, one aspect of the invention provides initial estimates of signal and noise, such as by using an efficient curve fitting technique. Thereafter, the energy of received pilot symbols is used to provide a finer estimation of the signal and noise. Thus, aspects of the present invention overcome problems in prior systems, and provide additional benefits, as those skilled in the relevant art will appreciate from the following discussion.

In a broad sense, aspects of the invention include a method for estimating channel conditions of received signals. The method includes: (a) receiving a signal encoded with concatenated codes over a channel having noise, wherein the received signal has a certain amplitude; (b) estimating a certain amplitude based on the received signal; and (c) separately estimating a variance $\sigma$ of the noise, based on the received pilot signal.

BRIEF DESCRIPTION OF THE FIGURES

In the figures, like reference characters identify similar elements. For ease in identifying the discussion of any particular element, the most significant digit in a reference number refers to the figure number in which that element is first introduced (e.g., element 204 is first introduced and discussed with respect to FIG. 2).

DETAILED DESCRIPTION OF THE PREFERRED EMBODIMENTS

A communication system, and in particular, an apparatus and method for controlling signal interference in the system, is described in detail herein. In the following description, numerous specific details are provided to give a thorough understanding of the invention. One skilled in the relevant art, however, will readily recognize that the invention can be practiced without these specific details, or with alternative elements or steps. In other instances, well-known structures and methods are not shown in detail to avoid obscuring the invention.

Figure 1:
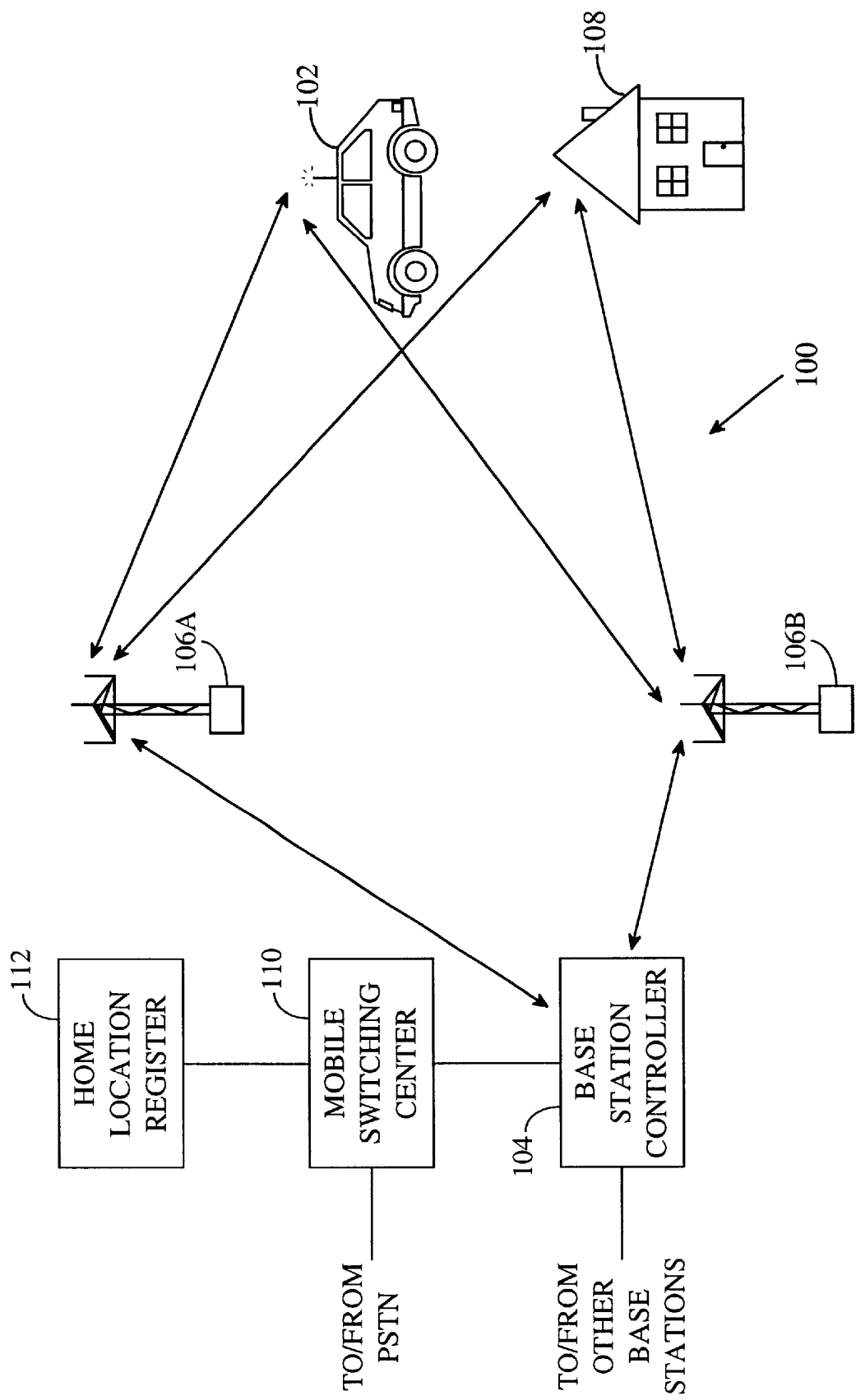
FIG. 1 is a simplified block diagram of a wireless communications system employing the invention.

FIG. 1 illustrates an exemplary cellular subscriber communication system 100, which uses multiple access techniques such as CDMA for communicating between users of user stations (e.g., mobile telephones) and cell-sites or base stations. In FIG. 1, a mobile user station 102 communicates with a base station controller 104 through one or more base stations 106A, 106B, etc. Similarly, a fixed user station 108 communicates with the base station controller 104, but through only one or more predetermined and proximate base stations, such as the base stations 106A and 106B.

The base station controller 104 is coupled to and typically includes interface and processing circuitry for providing system control to the base stations 106A and 106B. The base station controller 104 may also be coupled to and communicate with other base stations 106A and 106B, and possibly even other base station controllers. The base station controller 104 is coupled to a mobile switching center 110, which in turn is coupled to a home location register 112. During registration of each user station 102 or 108 at the beginning of each call, the base station controller 104 and the mobile switching center 110 compare registration signals received from the user stations 102 or 108 to data contained in the home location register 112, as is known in the art. Soft handoffs may occur between the base station controller 104 and other base station controllers, and even between the mobile switching center 110 and other mobile switching centers, as is known by those skilled in the art.

When the system 100 processes telephone or data traffic calls, the base station controller 104 establishes, maintains and terminates the wireless link with the mobile station 102, and the fixed user station 108, while the mobile switching center 110 establishes, maintains and terminates communications with a Public Switched Telephone Network (PSTN). While the discussion below focuses on signals transmitted between the base station 106A and the mobile station 102, those skilled in the art will recognize that the discussion equally applies to other base stations, and to the fixed user station 108.

Figure 2:
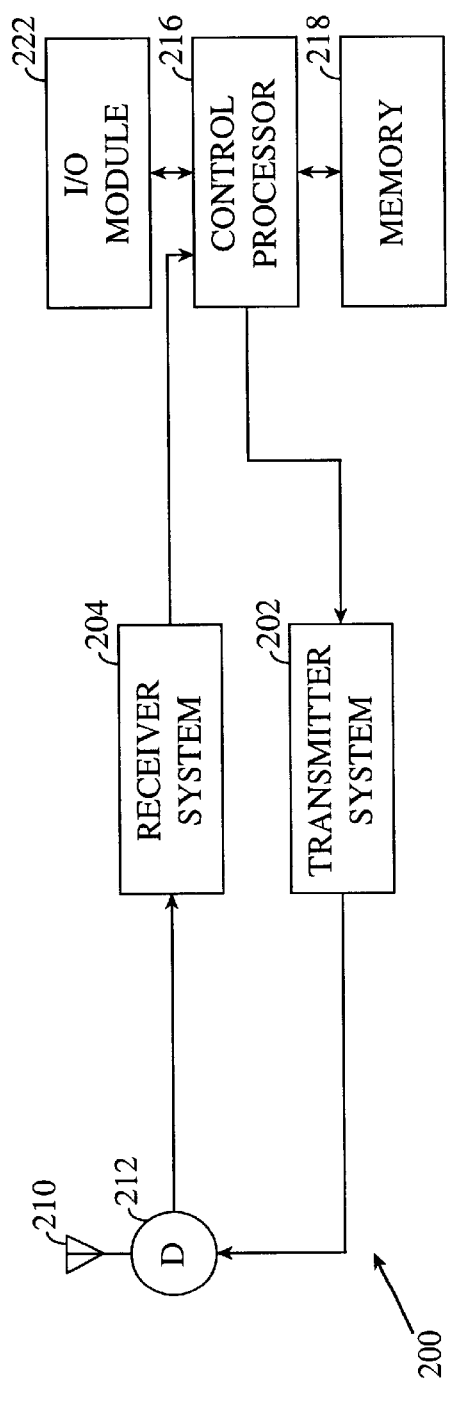
FIG. 2 is a simplified block diagram of a transceiver in the wireless communication system of FIG. 1, in accordance with embodiments of the invention.

FIG. 2 is a simplified block diagram of a portion of a transceiver 200 for use in either the base station 106A or 106B or the user stations 102 or 108 in the wireless communication system 100 of FIG. 1, under embodiments of the invention. In the example of FIG. 2, the transceiver 200 includes a transmitter system 202 and receiver system 204 sharing an antenna 210 that transmits and receives signals to and from other transceivers 200. A duplexer 212 separates received signals from signals being transmitted by the transmitter system 202 and routes the received signals to the receiver system 204. The receiver system 204 frequency shifts, demodulates and decodes the received signal. For example, the receiver system 204 converts received signals to either baseband or an intermediate frequency and performs Walsh code demodulation, and also performs power and signal quality measurements.

A control processor 216 provides much of the processing of the received signal, as described below. A memory 218 permanently stores routines performed by the control processor 216, and provides a temporary storage of data such as received frames. The transmitter system 202 encodes, modulates, amplifies and up converts signals to be transmitted.

In one embodiment, the transmitter system 202 forms a forward traffic link data signal for re-transmission of received signals by the base stations 106A or 106B to the user stations 102 or 108. In another embodiment, the transmitter system 202 forms a reverse link traffic data signal for transmission from the user stations 102 or 108 back to the base station 106A. In the mobile station 102, the receiver system 204 provides decoded received data to the user, and accepts information for transmission through the transmitter system 202 from the user, via an input/output (I/O) module 222 coupled to the control processor 216.

Figure 3:
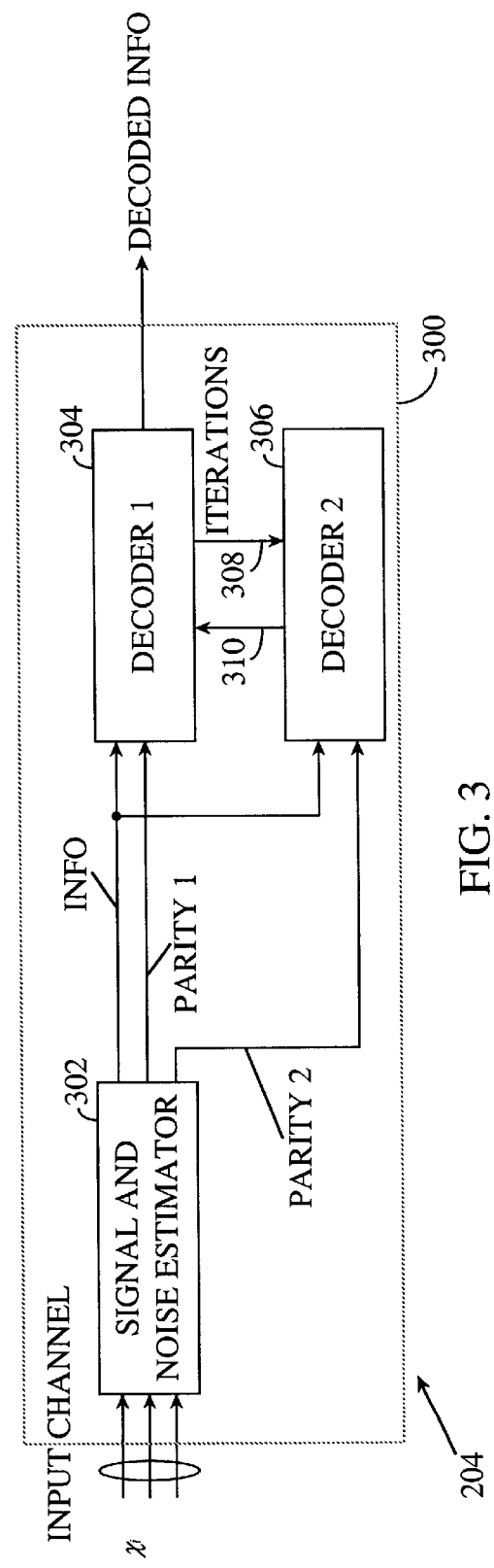
FIG. 3 is a simplified block diagram of a receiver in the transceiver of FIG. 2, in accordance with embodiments of the invention.

Referring to FIG. 3, a turbo decoder 300, which forms part of the receiver system 204, is shown. Alternatively, the decoder 300 may form part of the control processor 216 or the control processor may perform the operations described below for the decoder 300. The decoder 300 includes a signal and noise estimator 302 that receives an input channel having information and two parity signals or channels. The signal and noise estimator 302 separately estimates the power of the signal and noise in the received input channel, as described more fully below.

A pair of simple decoders 304 and 306 each receive the information signal from the input channel. Additionally, the first decoder 304 (Decoder 1) receives the first parity symbol, while the second decoder 306 (Decoder 2) receives the second parity symbol. For example, the decoder 300 (and the transceiver 200) may exist in the mobile station 102, and receive the information and parity symbols from the base station 106A. As noted above, a typical turbo encoder at the base station 106A (not shown) provides a pair of simple encoders that generate parity signals from two simple recursive convolutional codes, where such codes have a small number of states. Thus, the parity symbols produced by the first encoder are received by the first decoder 304, while the parity symbols produced by the second encoder are received by the second decoder 306.

The decoders 304 and 306 are matched to the codes of their respective encoders. Importantly, the first decoder 304 provides an a posteriori likelihood estimate of decoded bits on the information channel to the second decoder 306 over line 308. The second decoder 306 does likewise over the line 310 for its corresponding estimate. The a posteriori estimates are used as a priori likelihoods for each decoder. Several iterations are performed until reaching a satisfactory convergence, at which point the final output of the likelihood estimates are provided.

To greatly improve the performance of the decoders 304 and 306, such decoders need an effective estimate of the power of both the signal and noise on the received input channel. Thus, the signal and noise estimator 302 separately analyzes signal and noise on the received input channel to generate appropriate estimates.

Two embodiments for the operation of the estimator 302 are described below. A first method is initially discussed, followed thereafter by a discussion of a preferred and likely superior method. Mathematically, the input signal xi to the decoder 300 may be represented as:

$$X_i = b_i A_i + n_i, \quad (1)$$

where $b_i$ is a binary informational signal (such as ±1), A, is the amplitude of the signal, and Gaussian noise $n_i$ may be represented as: $n_i = N(0, \sigma^2)$, where the noise has zero means and a variance $\sigma^2$. The amplitude $A_1$ is the square root of the symbol energy, which is related to the energy per bit by $E_B R$, where R is the code rate, typically ½, and $E_B$ is the energy per bit. Equation (1) may be rewritten by replacing the amplitude $A_i$ with the square root of the energy per symbol (i.e., $\sqrt{E_{si}}$).

The signal and noise estimator 302 must provide separate estimates for the signal amplitude or energy $\sqrt{E_{si}}$ and the noise variance $\sigma^2$. If the signal $b_i$ were always equal to one, the signal and noise estimator 302 could readily measure the sample mean and the sample variance. However, since $\{b_i\}$ is equal to ±1, the mean is effectively zero.

Under one embodiment, the signal and noise estimator 302 may use the sample mean of the magnitude of $x_i$'s, under the following equations:

$$E(|x|) = \sigma \sqrt{2/\pi} \cdot e^{E_s/2\sigma^2} + \sqrt{E_s} \, erf(\sqrt{E_s}/\sigma\sqrt{2}) \quad (2)$$

and $$E(x^2) = E_s + \sigma^2, \text{ where} \quad (3)$$

$E_s$ can be estimated as:

$$E_s = E(x^2) - \sigma^2 \quad (4)$$

So, from estimates of $E(|x|)$ and $E(x^2)$, the system can estimate $E_s$ (or A) and σ separately. That is, the above equations may be written in the form of a fixed point:

$$\begin{pmatrix} \sqrt{E_S} \\ \sigma \end{pmatrix} = \begin{pmatrix} f_{\sqrt{E_S}}(\sqrt{E_S}, \sigma, E(|x|), E(x^2)) \\ f_\sigma(\sqrt{E_S}, \sigma, E(|x|), E(x^2)) \end{pmatrix} \quad (5)$$

$$\equiv \begin{pmatrix} E(|x|) \Big/ \Big( (\sigma/\sqrt{E_S}) \sqrt{2/\pi} e^{-E_s/2\sigma^2} + erf(\sqrt{E_S}/\sigma\sqrt{2}) \Big) \\ \sqrt{E(x^2) - E_S} \end{pmatrix}$$

and then an iteration used to solve for the fixed point.

To simplify the iteration, a simple curve fit may be used for the top part of equation (5). Since $$\sqrt{E_s} = E(|x|)/f(E_s/N_t), \quad (6)$$

a second negative order polynomial curve fit may be used for $f$ as a function of $E_s/N_t$.

As an example, combining equations (5) and (6), we derive:

$$E(x^2) = E_s + \sigma^2 \text{ and } E(|x|) = f(\sqrt{E_s}/\sigma)\sqrt{E_s} \quad (6A)$$

and suppose that, for the first step of the iteration process $f(\hat{A}_0/\hat{\sigma}_0) = 1$, which means that the SNR is infinite. Thus, we have:

$$-\sqrt{E(x^2)} - \hat{E} \quad (7)$$

and $$\hat{\sigma}_i^2 = E(x^2) - \hat{E}_{si} \quad (8)$$

Unfortunately, it may be difficult to determine the true noise on the channel at certain points. Considering a first extreme case with just one step in the iteration process, where the traffic symbol energy is much greater than the noise, i.e., $E_s >> \sigma^2$, then $E(x^2) \cong E_s$ and $E(|x|) \cong \sqrt{E_s}$. As a result, $E(x^2) - E(|x|)^2 << E_s$ and the ratio $$\frac{E_S}{\sigma^2}$$

is approximately infinite. However, considering the opposite extreme case where $E_s << \sigma^2$, then $E(x^2) \cong \sigma^2$ and $$E(|x|) \cong \sqrt{\frac{2}{\pi}} \sigma.$$

As result, $$E(x^2) - E(|x|)^2 \cong \left(1 - \frac{2}{\pi}\right) \sigma^2$$

and $$\frac{2/\pi}{1 - 2/\pi} > 1,$$

so the SNR in dB is greater than zero and does not approach negative infinity.

When estimating first a low SNR signal, part of the traffic symbol energy is misunderstood with the noise. The function that allows the system to find $E_s/\rho^2$ in the function of $\hat{E}_s/\hat{\sigma}^2$ is bijective so the method will not converge without a stopping condition. Therefore, one option is to use a stopping condition to end the iteration, such as:

$$[E(x^2) - \hat{E}_{si} - \hat{\sigma}_1^{-1}]^2 + [E(|x|) - f(\sqrt{\hat{E}_{si-1}}/\hat{\sigma}) \sqrt{\hat{E}_{si}}]^2 < \epsilon \quad (9)$$

Under the above embodiment, the system controls power based on estimating current received energy per symbol values. Power control attempts keep the received signal to noise ratio constant, and therefore the ratio $$\frac{\sqrt{E_S}}{\sigma}$$

varies little. Furthermore, the lower half of equation (5) stays relatively constant for the typical range of $$\frac{\sqrt{E_S}}{\sigma}$$

encountered. Thus, the system may use equation (5) with no iterations to estimate $\sqrt{E_s}$. In addition to this, CDMA demodulation techniques typically combine symbols from various fingers, carriers or by weighting them by the pilot signal (explained more below).

Figure 4A:
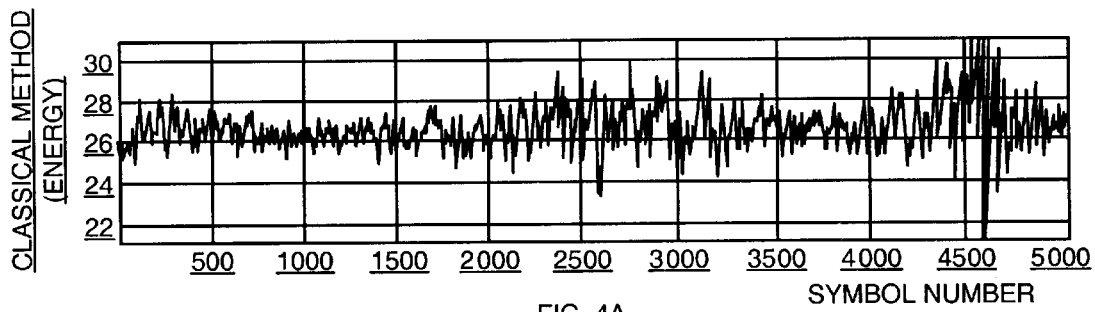
FIG. 4A is a plot of energy verses symbol number for a CDMA mobile demodulator in direct spread mode, moving at 3 km/h in a classical Rayleigh fading environment, using a classical method of estimating energy per symbol.
Figure 4B:
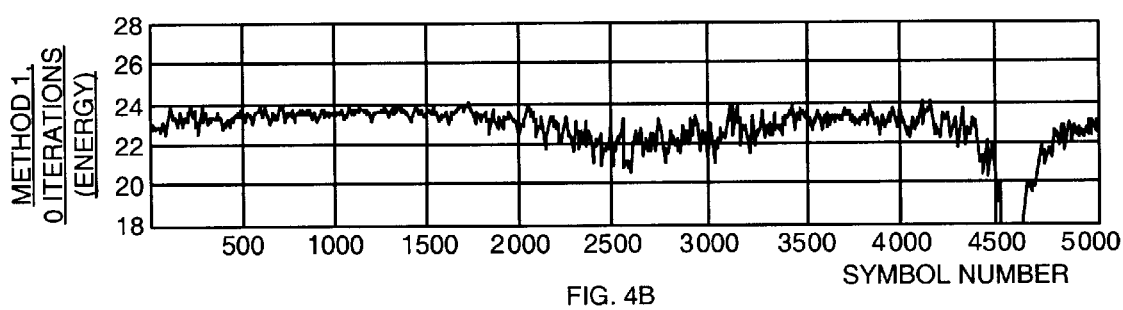
FIG. 4B is a plot of energy verses symbol number for a CDMA mobile demodulator in direct spread mode, moving at 3 km/h in a classical Rayleigh fading environment, using one embodiment of the invention.
Figure 4C:
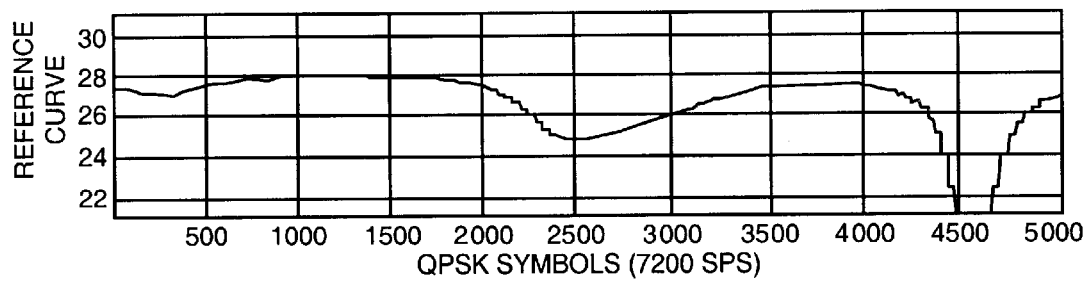
FIG. 4C is a plot of a reference energy curve showing energy per symbol in the fading environment of FIGS. 4A and 4B.

Using simulated measurements of the signal or traffic channel, under equation (5), the results of empirical simulations performed under the above method produce FIGS. 4A–4C. In particular, FIG. 4C shows a reference curve of amplitude verses quadrature phase shift key (QPSK) symbols 1–5,000 in a Rayleigh fading environment with the decoder moving at a rate of 3 km/h. The demodulator in this example is demodulating under CDMA techniques ("CDMA 2000") in Direct Spread mode. FIG. 4A shows a typical method of estimating amplitude and noise using classical estimations of the mean of the received signal. FIG. 4B shows amplitude verses QPSK symbol under the above method, where noise $\sigma^2$ and signal amplitude A are estimated separately. The curve of FIG. 4B closely follows the reference curve of FIG. 4C, while the curve of FIG. 4A fails to track the reference curve well. In fact, a deep fade between about symbols 4500 and 4700 in the reference curve of FIG. 4C is tracked quite well under the above method as shown in FIG. 4B. However, such a deep fade results in an opposite result under the classical method shown in FIG. 4A.

As noted above, the previous embodiment suffers from subtracting two noisy quantities. Additionally, the above fixed-point operator equation to solve for $E_s/\sigma^2$ has certain disadvantages in practical applications, namely, the iteration process might be slow to converge, and each step of the iteration requires computations for every sample. Thus, a straightforward method can be easier and quicker in computation time. Another problem with the above embodiment is that an acceptable beginning point for the iteration is difficult to find.

A second, preferred embodiment, derived in part from the Summers and Wilson method, avoids the subtraction of equation (5) and provides a good estimate for $E_s$ and $\sigma^2$. This second embodiment begins with the following equation:

$$\frac{E(x^2)}{E(|x|)^2} = \frac{1 + \frac{E_S}{\sigma^2}}{\left(\sqrt{\frac{2}{\pi}} e^{-\frac{E_S}{2\sigma^2}} + \sqrt{\frac{E_S}{\sigma^2}} \left(erf\left(\sqrt{\frac{E_S}{2\sigma^2}}\right)\right)\right)^2} = g\left(\frac{E_S}{\sigma^2}\right), \quad (10)$$

where the two means of the left part may be computed under the above fixed-point method; the ratio is a function of $E_s/\sigma^2$. In equation (10), a simple curve fit may be used to inverse this function. The complexity of this computation is equivalent to the complexity of the above fixed-point method, but with only one step.

To ensure that the second embodiment provides advantages over the first embodiment, consider the two extreme cases applied to the first embodiment. Considering the first extreme case where the traffic symbol energy is much greater than the noise, $E_s >> \sigma^2$, then $E(x^2) \cong \sigma_s$ and $E(|x|) \cong \sqrt{E_s}$. Thus, $E(x^2)/E(|x|)^2 \cong 1$. Considering the opposite extreme case where the traffic symbol energy is much less than the noise, $E_s << \sigma^2$, then $E(x^2) \cong E_s$ and $$E(|x|) \cong \sqrt{\frac{2}{\pi}} \sigma.$$

Thus, $$E(x^2)/(E(|x|))^2 \cong \frac{2}{\pi}.$$

These two extreme cases provide the two bounds of the ratio of (10), and show that the ratio for the two extreme cases is approximately equal to one. Intuitively, the more noise, the bigger the ratio under equation (10). The complexity of the equation prevents the determination of a closed-form solution for $E_s/\sigma^2$ from statistics. This difficulty may be alleviated by first evaluating the equation, on a point-wise basis, over the range of $E_s/\sigma^2$ 's of interest and then utilizing a simple polynomial function to approximate the relationship between the statistical ratio and $E_s/\sigma^2$.

The complexity of equation (10) may be reduced by employing a very simple second order curve fit by using $$z = \frac{E(x^2)}{E(|x|)^2}.$$

An example of a simple second order curve fit is described in the above article by Summers and Wilson. Such a curve fit provides the following:

$$g\left(\frac{E_S}{\sigma^2}\right) \text{ in dB} \approx -34.0516 z^2 + 65.9548 z - 23.6184 \quad (11)$$

Figure 5:
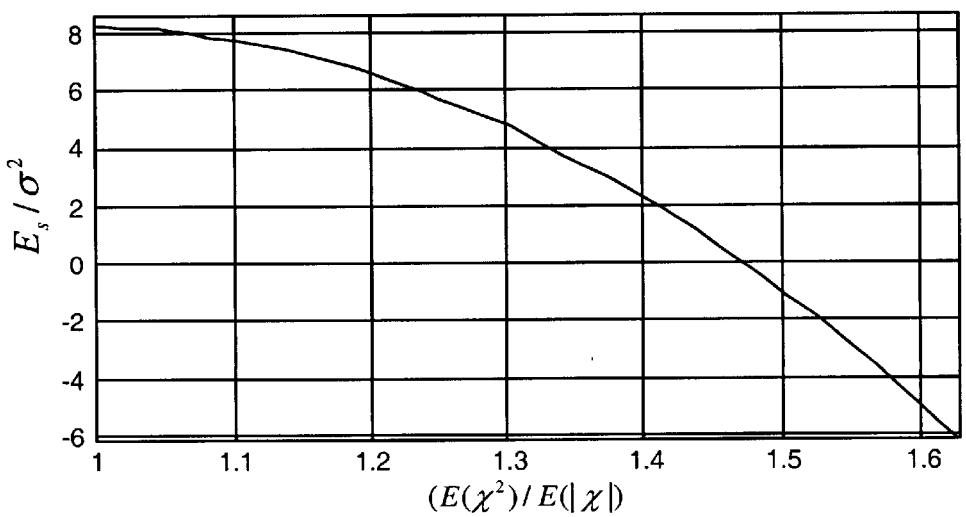
FIG. 5 is a plot of a function $g(E(x^2)/E(|x|))$.

The function g of equation (11) is not bijective, which means that for every z found under this equation, there is one and only one ratio $E_s/\sigma^2$. FIG. 5 shows the function g for the ratio $E(x^2)/E(|x|)$, versus the ratio $E_s/sigma^2$. The variance may be found under known methods, such as those described in an article by M. Reed and J. Asenstorfer, entitled "A Novel Variance Estimator for Turbocode Decoding," in *Int'l Conf. Telecommunications*, Melbourne, Australia, April 1997, pp. 173–178.

Basically, the mean SNR estimate will be less than the true SNR. Some bias occurs, due to the fact that deviations exist between the fit of the second-order polynomial estimate and the actual function of the sample averages. The curve fit does not apply for very small SNR, nor very large SNR. However, if the SNR is very high, then the decoders 304 and 306 can readily decode the frame. On the other hand, if the SNR is very low, then the frame is lost anyway. If the SNR is in-between, a good estimation of the SNR helps the decoders 304 and 306; so the curve estimates the SNR in the range of about –4 dB to 8 dB.

To achieve a frame error rate (FER) of 1 percent, the traffic channel doesn't need a very high signal to noise ratio;

however, a good estimation of the energy of the traffic symbols, and the associated noise is quite difficult to obtain with only the incoming uncoded bits:

$$x_i \cong \sqrt{E_s} b_i + n_i \quad (12)$$

It is even more difficult when the signal to noise ratio is low.

Under existing CDMA systems, the energy of the traffic channel over the forward link sent by the base station 106 is changing by plus or minus half a dB after each power control command. The TIA/EIA/IS-95-A CDMA standard requires sixteen power control commands during each frame (with 50 frames per second), at 9600 kb/s, where the energy of the traffic channel transmitted during one power control bit group remains constant. The IS-95 standard, as well as other modulation schemes, employ a pilot channel for transmitting pilot symbols from each base station. The energy of the pilot symbols is constant for a given base station 106. As a consequence, the ratio between the pilot's energy and the traffic's energy is constant during one power control bit group. More detail regarding pilot symbols may be found, for example, in co-inventor, Dr. Holtzman's U.S. patent application Ser. No. 09/144,402, entitled "Method and Apparatus for Reducing Amplitude Variations and Interference in Communication Signals, Such as in Wireless Communication Signals Employing Inserted Pilot Symbols," filed Aug. 31, 1998.

A better approximation of the traffic's energy could be obtained from estimating of the pilot symbols' energy, which is more accurate than estimating the changing energy over the traffic channel. Thus, the pilot channel can be used to provide a separate estimate for the noise variance $\sigma$. Consequently, equation (10) may be simplified by first determining a separate estimate of $\sigma$, and then estimating $E_s$ from the top half of equation (10) using an estimate of $E|x|$ from the signal or traffic channel, or estimate $E_s$ from bottom half of equation (10) using an estimate of $E(x^2)$ from the signal or traffic channel. By finding the right ratio between the energy of the pilot symbols $E_p$ and a first estimation of $E_s$, a second estimation of $E_s$ can be done. $E_p$ is divided by the approximation of the ratio to find $E_s$. $E_p$ is stronger than $E_s$ (typically a fifth of the base station power is allocated to $E_p$), and thus is more accurate.

In sum, the second embodiment described above uses first an approximation of equation (10). Second, the received energy of pilot symbols and the ratio between the pilot's and the traffic's channel energy provide a finer estimation.

Figure 6:
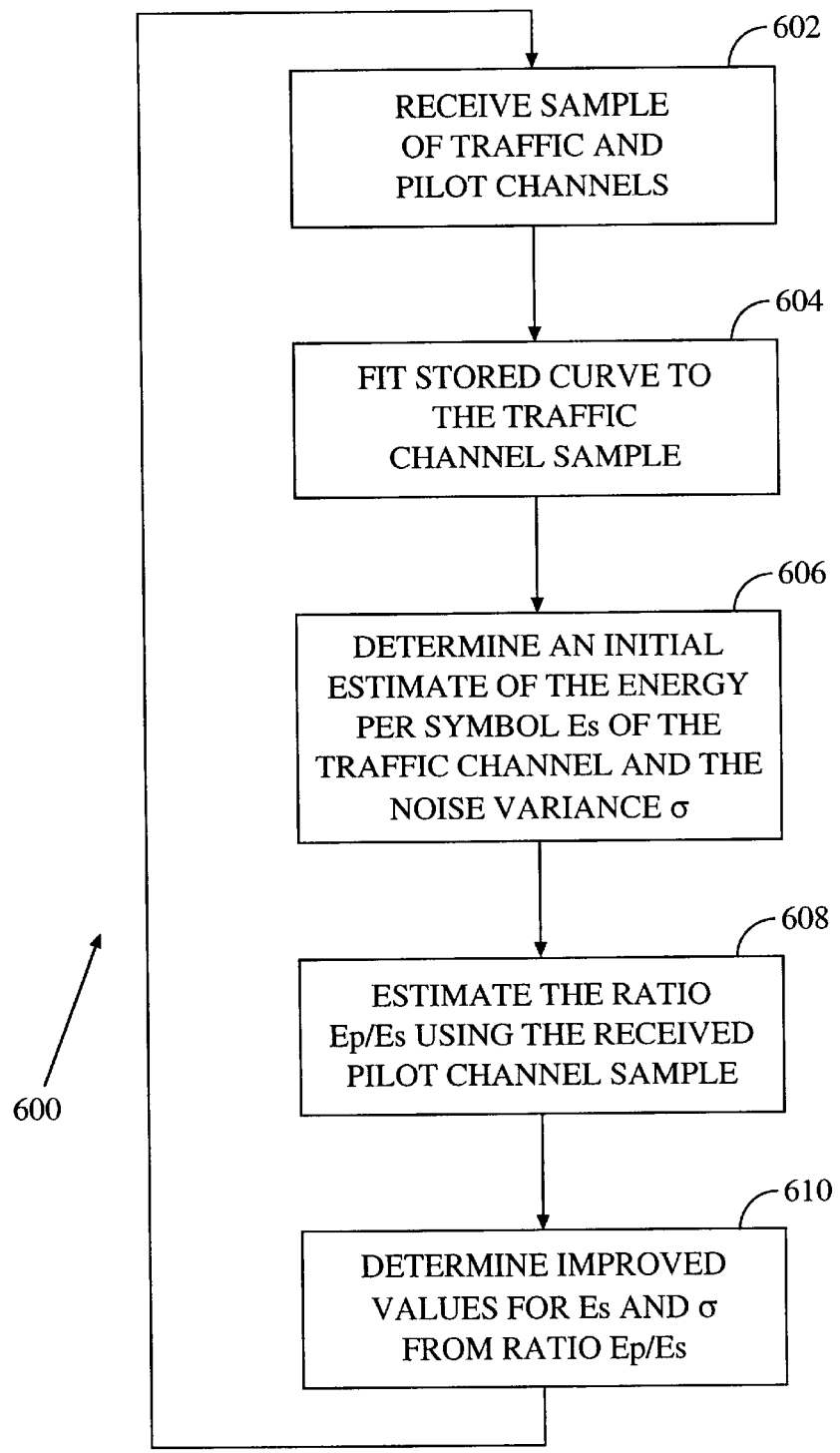
FIG. 6 is a simplified flow chart of a process for estimating channel performance performed by the receiver of FIG. 3.

Referring to FIG. 6, a routine 600 performed by the signal and noise estimator 302 is shown. Those skilled in the relevant art can read source code or program logic arrays based on the detailed description provided herein. In step 602, the signal and noise estimator 302 receives a sample of the incoming traffic signal. Such a sample is greater than or equal to one symbol, and can be a frame or a power control group.

In step 604, the signal and noise estimator 302 fits a stored curve to the traffic channel sample. The stored curve may be, for example, the curve of FIG. 5. Such a curve may be stored in the memory 218, and the receiver system 204 or control processor 216 may access such a curve for the appropriate curve fitting. In step 606, the signal and noise estimator 302 determines that the initial estimate of the energy per symbol $E_s$ of the traffic channel, and determines the estimate of the noise variance of $\sigma$.

In step 608, the signal and noise estimator 302 estimates the ratio of the energy of the pilot versus the energy of the symbol using the received pilot channel sample. The ratio in step 608 may be estimated as noted above, where the current ratio is calculated as follows: the current ratio is equal to ±half the previous ratio if the current ratio is higher or lower than the previous ratio, respectively. In step 610, the signal and noise estimator 302 determines improved values for $E_s$ and $\sigma$ from the ratio $E_p/E_s$. Thereafter, the routine 600 loops back to step 602 where another sample is received and processed.

Those skilled in the relevant art will appreciate that the routine 600 and other functions and methods described above may be performed by the signal and noise estimator 302 and/or the control processor 216, where the signal and noise estimator 302 is implemented by a custom ASIC, by a digital signal processing integrated circuit, through conventional logic circuit elements or through software programming of a general purpose computer or microprocessor (e.g., the control processor 218).

Although specific embodiments of, and examples for, the invention are described herein for illustrative purposes, various equivalent modifications can be made without departing from the scope of the invention, as will be recognized by those skilled in the relevant art. For example, while many of the above embodiments are shown and described as being implemented in hardware (e.g., one or more integrated circuits designed specifically for a task), such embodiments could equally be implemented in software and be performed by one or more processors. Such software can be stored on any suitable computer-readable medium, such as micro code stored in a semiconductor chip, as computer-readable disk, or downloaded and stored from a server. The various embodiments described above can be combined to provide further embodiments. In general, the estimation techniques described in detail above are examples, and those skilled in the relevant art can create similar techniques under the teachings and concepts of the invention.

The teachings provided herein of the invention can be applied to other communication systems, not necessarily the exemplary communication system described above. For example, while the invention has been generally described above as being employed in the CDMA communication system 100, the invention may be applied to other digital or analog communication systems, particularly concatenated encoding schemes. The invention can also be modified, if necessary, to employ the systems, circuits and concepts of the various patents described above, all of which are incorporated by reference.

These and other changes can be made to the invention in light of the above detailed description. In general, in the following claims, the terms used should not be construed to limit the invention to the specific embodiments disclosed in the specification and the claims, but should be construed to include any communication system that operates under the claims for signal and noise power estimation in transmitted signals. Accordingly, the invention is not limited by the disclosure, but instead its scope is to be determined entirely by the following claims.

What is claimed is:

1. In a communication system having a base station and a plurality of user stations that exchange communication signals between the base station and each of the plurality of users, a method for estimating channel conditions of received signals, the method comprising:

receiving at least one code division multiple access (CDMA) signal over a forward link traffic channel between the base station and at least one user station, wherein the traffic channel has noise, and wherein the received CDMA signal has a certain amplitude and is encoded using turbo codes;

separately estimating the certain amplitude of the received CDMA signal, and a variance σ of the noise, based on the received CDMA signal;

receiving a pilot signal from the base station; and before turbo decoding of the received CDMA signal, producing a more accurate estimate of the certain amplitude of the received CDMA signal and the variance σ of the noise based on the step of separately estimating and based on the received pilot signal.

2. The method of claim 1 wherein separately estimating includes fitting a stored curve to the received CDMA signal, if the certain amplitude is between −4 and 8 dB, to estimate an energy per symbol $E_s$ of the received CDMA signal or the variance σ of the noise.

3. The method of claim 1 wherein separately estimating includes fitting a stored curve to the received CDMA signal to estimate the certain amplitude of the received CDMA signal or the variance σ of the noise.

4. The method of claim 1 wherein separately estimating includes separately estimating an energy per symbol in the received CDMA signal, and a variance σ of the noise, based on the following equation:

$$\frac{E(x^2)}{(E(|x|))^2} = \frac{1 + \frac{E_s}{\sigma^2}}{\left(\sqrt{\frac{2}{\pi}} e^{-\frac{E_s}{2\sigma^2}} + \sqrt{\frac{E_s}{\sigma^2}}\left(erf\left(\sqrt{\frac{E_s}{2\sigma^2}}\right)\right)\right)^2} = g\left(\frac{E_s}{\sigma^2}\right).$$

5. A method for estimating channel conditions of received signals, the method comprising:

receiving a signal encoded with concatenated codes over a channel having noise, wherein the received signal has a certain amplitude;

estimating the certain amplitude based on the received signal; and separately estimating a variance σ of the noise, based on the received signal;

wherein separately estimating includes fitting a stored curve to the received signal.

6. The method of claim 5, further comprising;

receiving a pilot signal; and producing a more accurate estimate of the certain amplitude and the variance σ of the noise based on the received pilot signal, and wherein estimating the certain amplitude or separately estimating includes fitting a stored curve to the received signal to estimate an energy per symbol $E_s$ of the received signal or the variance σ of the noise, wherein the stored curve has the following function:

$$g\left(\frac{E_s}{\sigma^2}\right) \text{ in dB} \approx -34.0516 z^2 + 65.9548 z - 23.6184.$$

7. The method of claim 5 wherein estimating the certain amplitude and separately estimating include separately estimating an energy per symbol in the received signal, and the variance σ of the noise, based on the following equation:

$$\frac{E(x^2)}{(E(|x|))^2} = \frac{1 + \frac{E_s}{\sigma^2}}{\left(\sqrt{\frac{2}{\pi}} e^{-\frac{E_s}{2\sigma^2}} + \sqrt{\frac{E_s}{\sigma^2}}\left(erf\left(\sqrt{\frac{E_s}{2\sigma^2}}\right)\right)\right)^2} = g\left(\frac{E_s}{\sigma^2}\right).$$

8. The method of claim 5, further comprising:

receiving a pilot signal; and producing a more accurate estimate of the certain amplitude and the variance σ of the noise based on the received pilot signal, including altering a current pilot per symbol energy ratio based on at least one previous pilot per symbol energy ratio.

9. The method of claim 5, further comprising;

receiving a pilot signal; and producing a more accurate estimate of the certain amplitude and the variance σ of the noise based on the received pilot signal.

10. The method of claim 5 wherein estimating the certain amplitude and separately estimating includes separately estimating an energy per symbol in the received signal, and the variance σ of the noise, based on the following equation:

$$\begin{pmatrix} \sqrt{E_s} \\ \sigma \end{pmatrix} = \begin{pmatrix} f_{\sqrt{E_s}}(\sqrt{E_s}, \sigma, E(|x|), E(x^2)) \\ f\sigma(\sqrt{E_s}, \sigma, E(|x|), E(x^2)) \end{pmatrix}$$

$$= \begin{pmatrix} E(|x|) / \left((\sigma/\sqrt{E_s})\sqrt{2/\pi} e^{-E_s/2\sigma^2} + erf(\sqrt{E_s}/\sigma\sqrt{2})\right) \\ \sqrt{E(x^2) - E_s} \end{pmatrix}$$

and iteratively solving for a fixed point, where $E_s$ is an energy per symbol of the received signal and x represents a certain amplitude of a received binary signal plus the noise.

11. The method of claim 5, further comprising;

iteratively estimating the certain amplitude and separately estimating the variance; and stopping the iterations when a stopping condition is met.

12. In a communication system having a base station and a plurality of user stations that exchange communication signals between the base station and each of the plurality of users, an apparatus for estimating channel conditions of received signals, the apparatus comprising:

means for receiving a signal encoded with concatenated codes over a channel having noise, wherein the received signal has a certain amplitude;

means for estimating the certain amplitude based on the received signal; and means, coupled to the means for estimating, for separately estimating a variance σ of the noise, based on the received signal; wherein the means for estimating includes means for fitting a stored curve to the received signal.

13. The apparatus of claim 12, further comprising;

means for receiving a pilot signal; and means for producing a more accurate estimate of the certain amplitude and the variance σ of the noise based on the received pilot signal, and wherein the means for estimating the certain amplitude or the means for separately estimating includes means for fitting a stored curve to the received signal to estimate an energy per symbol $E_s$ of the received signal or the variance σ of the noise.

14. The apparatus of claim 12 wherein the means for estimating the certain amplitude and the means for separately estimating include means for separately estimating an energy per symbol in the received signal, and the variance $\sigma$ of the noise, based on the following equation:

$$\frac{E(x^2)}{(E(|x|))^2} = \frac{1 + \frac{E_S}{\sigma^2}}{\left(\sqrt{\frac{2}{\pi}} e^{-\frac{E_S}{2\sigma^2}} + \sqrt{\frac{E_S}{\sigma^2}} \left(erf\left(\sqrt{\frac{E_S}{2\sigma^2}}\right)\right)\right)^2} = g\left(\frac{E_S}{\sigma^2}\right).$$

15. The apparatus of claim 12, further comprising:
means for receiving a pilot signal; and
means for producing a more accurate estimate of the certain amplitude and the variance $\sigma$ of the noise based on the received pilot signal, including altering a current pilot per symbol energy ratio based on at least one previous pilot per symbol energy ratio.

16. The apparatus of claim 12, further comprising;
iteratively estimating the certain amplitude and separately estimating the variance; and
stopping the iterations when a stopping condition is met.

17. A computer-readable medium having instructions stored thereon to cause a computer in a communication system to perform a method, the method comprising:
receiving a signal encoded with concatenated codes over a channel having noise, wherein the received signal has a certain amplitude;
estimating the certain amplitude based on the received signal; and
separately estimating a variance $\sigma$ of the noise, based on the received signal;
wherein separately estimating includes fitting a stored curve to the received signal.

18. The computer-readable medium of claim 17, further comprising;
receiving a pilot signal; and
producing a more accurate estimate of the certain amplitude and the variance $\sigma$ of the noise based on the received pilot signal, and
wherein estimating the certain amplitude or separately estimating includes fitting a stored curve to the received signal to estimate an energy per symbol $E_s$ of the received signal or the variance $\sigma$ of the noise.

19. The computer-readable medium of claim 17 wherein estimating the certain amplitude and separately estimating include separately estimating an energy per symbol in the received signal, and the variance $\sigma$ of the noise, based on the following equation:

$$\frac{E(x^2)}{(E(|x|))^2} = \frac{1 + \frac{E_S}{\sigma^2}}{\left(\sqrt{\frac{2}{\pi}} e^{-\frac{E_S}{2\sigma^2}} + \sqrt{\frac{E_S}{\sigma^2}} \left(erf\left(\sqrt{\frac{E_S}{2\sigma^2}}\right)\right)\right)^2} = g\left(\frac{E_S}{\sigma^2}\right).$$

20. The computer-readable medium of claim 17, further comprising:
receiving a pilot signal; and
producing a more accurate estimate of the certain amplitude and the variance $\sigma$ of the noise based on the received pilot signal, including altering a current pilot per symbol energy ratio based on at least one previous pilot per symbol energy ratio.

21. The computer-readable medium of claim 17, further comprising;
receiving a pilot signal; and
producing a more accurate estimate of the certain amplitude and the variance $\sigma$ of the noise based on the received pilot signal.

22. The computer-readable medium of claim 17 wherein estimating the certain amplitude and separately estimating includes separately estimating an energy per symbol in the received signal, and the variance $\sigma$ of the noise, based on the following equation:

$$\begin{pmatrix} \sqrt{E_S} \\ \sigma \end{pmatrix} = \begin{pmatrix} f_{\sqrt{E_S}}(\sqrt{E_S}, \sigma, E(|x|), E(x^2)) \\ f\sigma(\sqrt{E_S}, \sigma, E(|x|), E(x^2)) \end{pmatrix}$$

$$= \begin{pmatrix} E(|x|) / \left((\sigma/\sqrt{E_S})\sqrt{2/\pi}e^{-E_S/2\sigma^2} + erf(\sqrt{E_S}/\sigma\sqrt{2})\right) \\ \sqrt{E(x^2) - E_S} \end{pmatrix}$$

and iteratively solving for a fixed point, where $E_s$ is an energy per symbol of the received signal and x represents a certain amplitude of a received binary signal plus the noise.

23. An apparatus for receiving communication signals, the apparatus comprising:
at least first and second decoders that receive at least one turbo encoded signal over a traffic channel, wherein the traffic channel has noise, and wherein the received signal has a certain amplitude; and
an estimator coupled to inputs of the first and second decoders, wherein the estimator receives the at least one turbo encoded signal and separately estimates the noise of the traffic channel and the certain amplitude based on the received signal;
wherein the estimator fits a stored curve to the received signal.

24. The apparatus of claim 23 wherein the estimator fits a stored curve to the received signal to estimate an energy per symbol $E_s$ of the received signal or a variance $\sigma$ the noise, and wherein the estimator also receives a pilot signal, and produces a more accurate estimate of the certain amplitude and the noise based on the received pilot signal.

25. The apparatus of claim 23 wherein the estimator separately estimates an energy per symbol in the received signal, and a variance $\sigma$ of the noise, based on the following equation:

$$\frac{E(x^2)}{(E(|x|))^2} = \frac{1 + \frac{E_S}{\sigma^2}}{\left(\sqrt{\frac{2}{\pi}} e^{-\frac{E_S}{2\sigma^2}} + \sqrt{\frac{E_S}{\sigma^2}} \left(erf\left(\sqrt{\frac{E_S}{2\sigma^2}}\right)\right)\right)^2} = g\left(\frac{E_S}{\sigma^2}\right).$$

26. The apparatus of claim 23 wherein the estimator receives a pilot signal, and produces a more accurate estimate of the certain amplitude and the noise based on the received pilot signal, including altering a current pilot per symbol energy ratio based in at least one previous pilot per symbol energy ratio.

27. The apparatus of claim 23 wherein the estimator receives a pilot signal, and produces a more accurate estimate of the certain amplitude and the noise based on the received pilot signal.

28. The apparatus of claim 23 wherein the estimator separately estimates an energy per symbol $E_s$ in the received signal, and a variance $\sigma$ of the noise, based on the following equation:

$$\begin{pmatrix} \sqrt{E_S} \\ \sigma \end{pmatrix} = \begin{pmatrix} f_{\sqrt{E_S}}(\sqrt{E_S}, \sigma, E(|x|), E(x^2)) \\ f\sigma(\sqrt{E_S}, \sigma, E(|x|), E(x^2)) \end{pmatrix}$$

$$\equiv \left( E(|x|) \Big/ \Big( (\sigma/\sqrt{E_S}) \sqrt{2/\pi} e^{-E_S/2\sigma^2} + erf(\sqrt{E_S}/\sigma\sqrt{2}) \Big) \over \sqrt{E(x^2) - E_S} \right)$$

and iteratively solves for a fixed point, where x represents a certain amplitude of a received binary signal plus the noise.

* * * * *